(12) United States Patent
Lewis et al.

(10) Patent No.: US 7,114,639 B2
(45) Date of Patent: Oct. 3, 2006

(54) VENT PLUG FOR SELF-CONTAINED VISCOUS LIQUID DISPENSER

(75) Inventors: Richard Paul Lewis, Marietta, GA (US); Randall Marc Bachtel, Duluth, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 330 days.

(21) Appl. No.: 10/745,770

(22) Filed: Dec. 23, 2003

(65) Prior Publication Data

US 2005/0133537 A1 Jun. 23, 2005

(51) Int. Cl.
*B67D 5/06* (2006.01)

(52) U.S. Cl. .................. 222/181.3; 222/380; 222/481.5

(58) Field of Classification Search ................. 222/156, 222/181.2, 181.3, 321.7, 380, 481.5, 494
See application file for complete search history.

(56) References Cited

U.S. PATENT DOCUMENTS

| | | | |
|---|---|---|---|
| 49,414 A | 8/1865 | Johnson | |
| 169,817 A | 11/1875 | Locke | |
| 201,352 A | 3/1878 | Little et al. | |
| 1,522,659 A | 1/1925 | Wells | |
| 1,587,080 A | 6/1926 | Marcelli | |
| 2,114,858 A | 4/1938 | Rosch | |
| 2,272,351 A | 2/1942 | Polcari | |
| 2,804,240 A | 8/1957 | Anderson | |
| 2,956,509 A | 10/1960 | Cooprider et al. | |
| 3,254,368 A | 6/1966 | Kullgren et al. | |
| 3,433,455 A | 3/1969 | Cook | |
| 4,441,633 A | 4/1984 | Bennett | |
| 4,964,544 A * | 10/1990 | Hanna et al. ............ | 222/181.2 |
| 5,472,121 A * | 12/1995 | Silano ........................ | 222/158 |
| 5,704,522 A * | 1/1998 | Orgeolet et al. ............ | 222/494 |
| 5,975,372 A | 11/1999 | Heyn | |
| 6,516,976 B1 | 2/2003 | Lewis et al. | |
| 6,533,145 B1 | 3/2003 | Lewis et al. | |
| 6,543,651 B1 | 4/2003 | Lewis et al. | |
| 6,575,334 B1 | 6/2003 | Lewis et al. | |
| 6,575,335 B1 | 6/2003 | Lewis et al. | |
| 2002/0074354 A1 | 6/2002 | Lewis et al. | |
| 2002/0074355 A1 | 6/2002 | Lewis et al. | |

FOREIGN PATENT DOCUMENTS

GB 2034799 6/1980
WO WO 02/49490 A1 6/2002

OTHER PUBLICATIONS

Patent Abstracts of Japan, JP 1258757, Oct. 16, 1989.
Patent Abstracts of Japan, JP 10028907, Feb. 3, 1998, Mitani Valve: KK.

* cited by examiner

*Primary Examiner*—Joseph A. Kaufman
(74) *Attorney, Agent, or Firm*—Richard M. Shane; Nathan P. Hendon

(57) ABSTRACT

A self-contained viscous liquid dispenser having an improved vent valve is provided. The vent valve includes a plug member having a sealing ridge at its perimeter. The vent valve is activated at reduced pressure differentials between the inside and outside of the dispenser. The vent valve also provides redundant sealing capability.

20 Claims, 9 Drawing Sheets

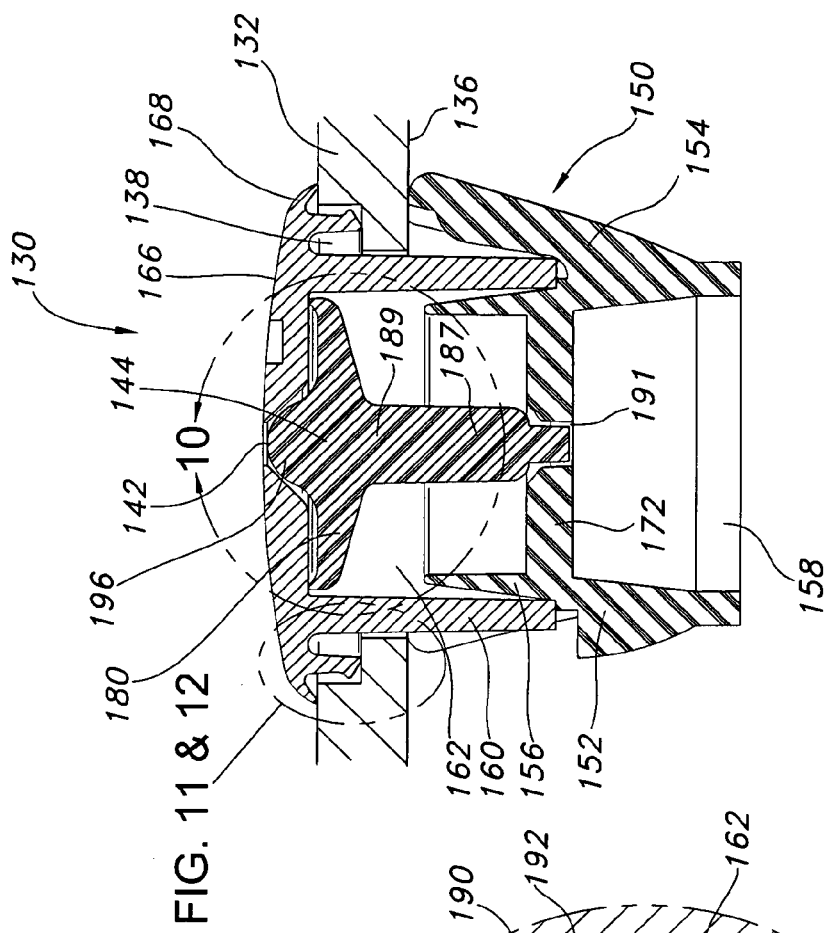
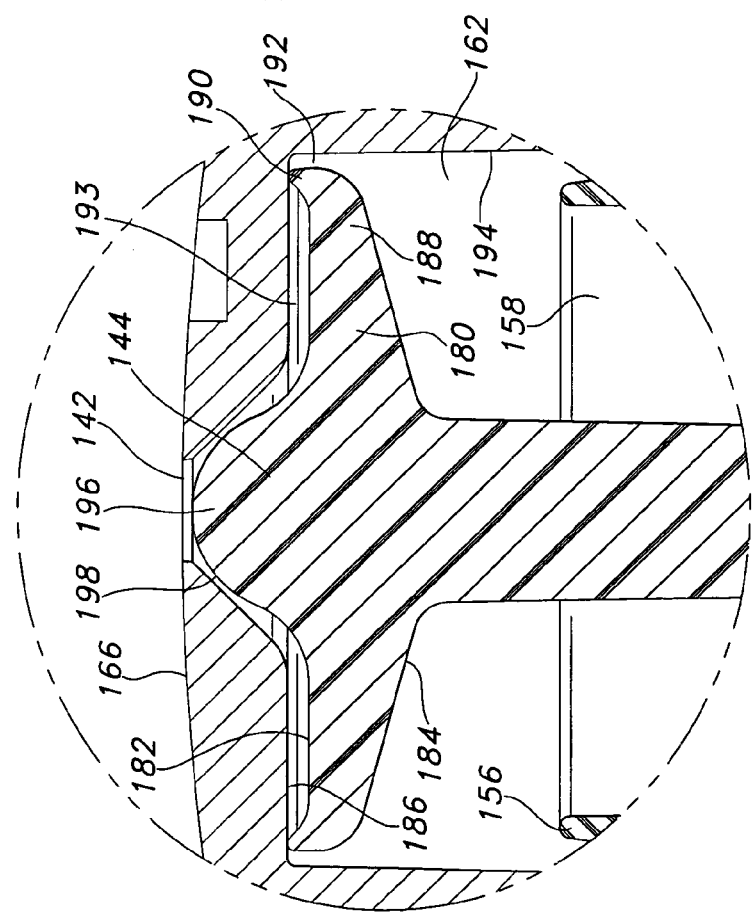
FIG. 9
FIG. 10

VENT PLUG FOR SELF-CONTAINED VISCOUS LIQUID DISPENSER

BACKGROUND OF THE INVENTION

Various configurations and models of liquid dispensers, particularly liquid soap dispensers, are well known in the art. Conventional dispensers typically employed in public restrooms and the like are wall-mounted units that typically include a housing or structure that contains the liquid to be dispensed. The dispensers typically include a delivery device, such as a dosing pump, and a device such as a lever or button for actuating the dosing pump.

Many dispensers have a vent valve. The vent valve serves to allow air to enter the reservoir as the liquid in the reservoir is dispensed. When the differential pressure between the inside and outside of the dispenser reaches a prescribed level, the vent valve opens and allows air to enter and replace the liquid that was dispensed. The opening in the dispenser through which the air flows is desirably small so as to be inconspicuous and help prevent leaks. Therefore it often takes an undesirably high pressure differential to activate the vent. There is therefore a need for a vent that activates at reduced pressure differentials.

Additionally, because many dispensers are single use dispensers that are discarded when empty, the components of the dispensers are often produced from inexpensive plastics. The plastic parts can often warp or deform to the point that the sealing ability of the vent becomes deficient. Therefore, there is a need for a vent that provides improved sealing capability.

The present invention is an improvement over existing systems in that it provides a disposable self-contained dispenser that is activated at reduced pressure differentials between the inside and outside of the dispenser. The present invention also provides a disposable self-contained dispenser having a vent that provides improved and redundant sealing capability.

SUMMARY OF THE INVENTION

Advantages of the invention will be set forth in part in the following description, or may be obvious from the description, or may be learned through practice of the invention.

In accordance with one embodiment of the present invention, a self-contained viscous liquid dispenser is disclosed that includes a housing defining an internal liquid reservoir, a manually operated dispensing pump mechanism disposed in liquid communication with the reservoir and having a delivery end disposed for delivering metered doses of viscous liquid from the reservoir upon actuation thereof by a user, and a vent mechanism disposed in an upper wall of the housing. The vent mechanism includes a body member insertable through an opening in the housing wall and a movable plug member. The body member defines a vent orifice disposed through an inside lower surface of the body member and a vent passage in communication therewith. The movable plug member is resiliently disposed in the vent passage and includes a plate-like or disc-like member having a perimeter. A sealing ridge is attached to and extends from the perimeter to contact the inside lower surface of the body member. In one aspect, the ridge extends substantially perpendicular to an upper surface of the plate-like or disc-like member. In contacting the inside lower surface of the body member, the ridge seals the orifice from the vent passage in an at-rest position. The plug member is movable to unseal the orifice and vent the reservoir upon a sufficient vacuum being established in the reservoir upon actuation of the pump mechanism.

In one aspect, the plug member includes a protrusion attached to the plate-like or disc-like member. The protrusion is located proximate the vent orifice and is desirably aligned with the vent orifice. The protrusion may extend into the vent orifice, but desirably does not contact the body member absent some failure of the sealing ridge.

In another aspect, the cross-sectional shape of the plate-like or disc-like member substantially matches the cross-sectional shape of the vent passage.

In a further aspect, the inside lower surface of the body member and the upper surface of the plate-like or disc-like member define an opening having a cross-sectional area greater than about five times the cross-sectional area of the vent orifice.

In an even further aspect, the thickness of the plate-like or disc-like member is between about five percent and about forty percent of the diameter of the plate-like or disc-like member.

In another aspect, the body member further includes at least one resilient member configured to engage and lock the body member to the housing wall. In that regard, the body member may include at least one resilient tab, desirably a plurality of resilient tabs, disposed to engage against an inner surface of the housing wall and exert an inward pulling force on the body member. The body member may further include a cap through which the vent orifice is defined. The cap may include a radially extending resilient circumferential lip that sealingly engages against the housing wall. The cap may be disposed above an upper surface of the housing wall with the resilient lip sealingly engaging against the upper surface. The cap may be disposed in a counterbore defined in the housing wall with the resilient lip sealingly engaging against a circumferential wall of the counterbore. The cap may further include a downwardly extending resilient annular skirt that sealingly engages against the housing wall. The resilient annular lip may be engaged against a circumferential side of the opening in the housing wall.

In one aspect, the vent passage has an upper and lower portion thereto. The ridge on the plug member seals the vent orifice from the lower vent passage in an at-rest position, and the plug member is movable to unseal the orifice and vent the reservoir upon a sufficient vacuum being established in the reservoir. The plug member may further include a protrusion attached to the plate-like or disc-like member. Desirably, the protrusion is aligned with the vent orifice. The protrusion may extend into the vent orifice provided communication is maintained between the vent orifice and the upper vent passage.

The invention will be described in greater detail below with reference to particular embodiments illustrated in the figures.

BRIEF DESCRIPTION OF THE DRAWINGS

FIG. 9 is a cross-sectional view of the vent plug taken along the lines indicated in FIG. 7;

FIG. 10 is an enlarged cross-sectional view of the designated portion of FIG. 9;

DETAILED DESCRIPTION

Figure 1:
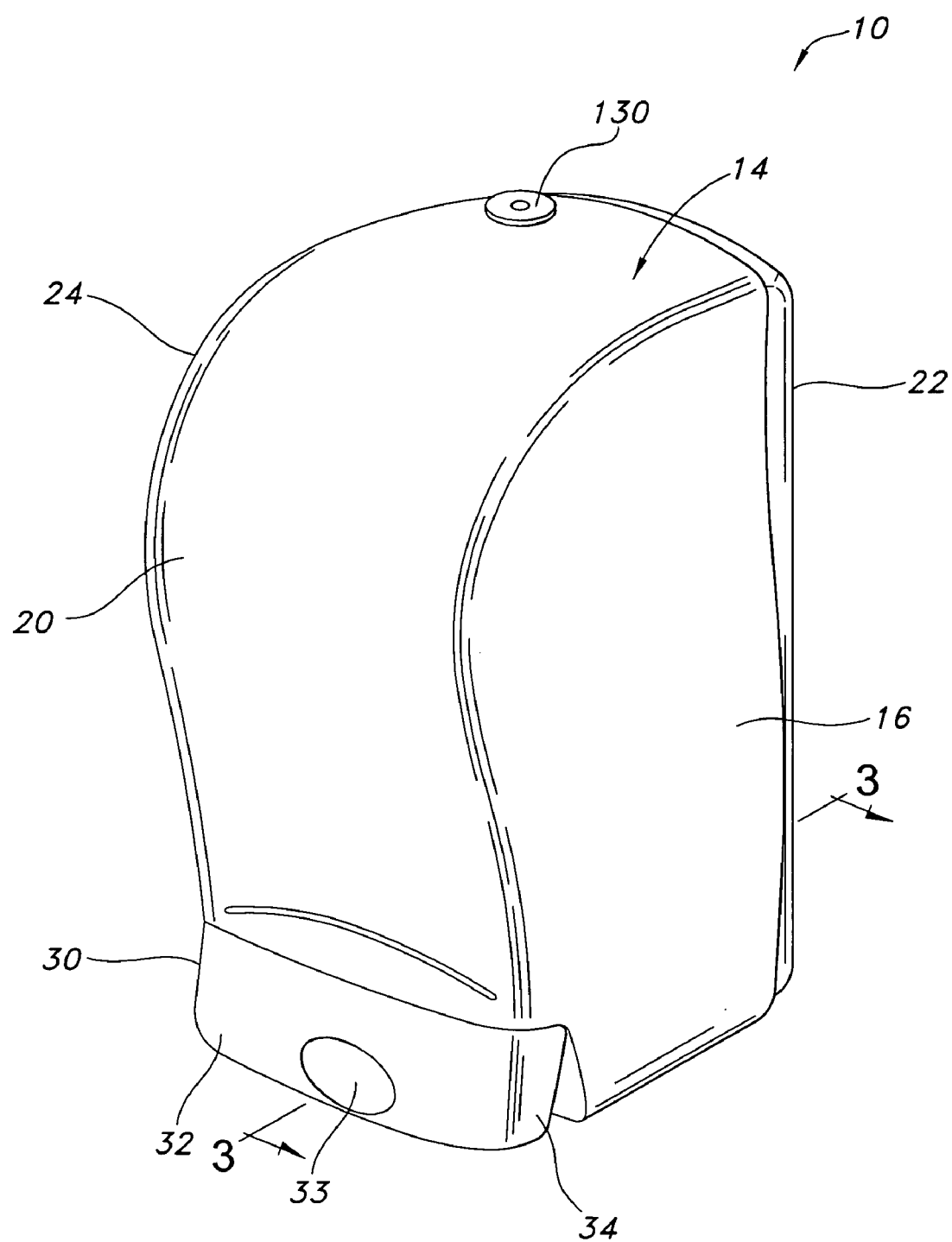
FIG. 1 is a perspective view of a dispenser according to the present invention.

Reference will now be made in detail to embodiments of the invention, one or more examples of which are illustrated in the drawings. Each example is provided by way of explanation of the invention, not meant as a limitation of the invention. For example, features illustrated or described as part of one embodiment, may be used with another embodiment, to yield still a further embodiment. It is intended that the present invention include modifications and variations to the embodiments described herein.

The present invention relates to a venting mechanism for use with any manner of liquid dispenser. The venting mechanism is particularly well suited for use with any manner of viscous liquid dispenser, for example soap dispensers, lotion dispenser, and the like. Examples of dispensers that may benefit from the vent valve of the present invention are described in WO 02/49490 A1 as well as U.S. Pat. No. 6,516,976 to Lewis et al., U.S. Pat. No. 6,533,145 to Lewis et al., U.S. Pat. No. 6,543,651 to Lewis et al., U.S. Pat. No. 6,575,334 to Lewis et al., and U.S. Pat. No. 6,575,335 to Lewis et al., and U.S. patent application publications 2002/0074354A1 and 2002/0074355A1, the entireties of which are incorporated herein by reference.

A viscous liquid dispenser 10 according to the invention is illustrated generally in the figures. The dispenser 10 is illustrated and described herein as a liquid soap dispenser, which is a particularly useful embodiment of the present invention. However, it should be appreciated that the present invention is not limited to a dispenser for liquid soap, but has application in any environment wherein it is desired to dispense a metered amount of a viscous liquid from a dispensing unit.

Figure 2:
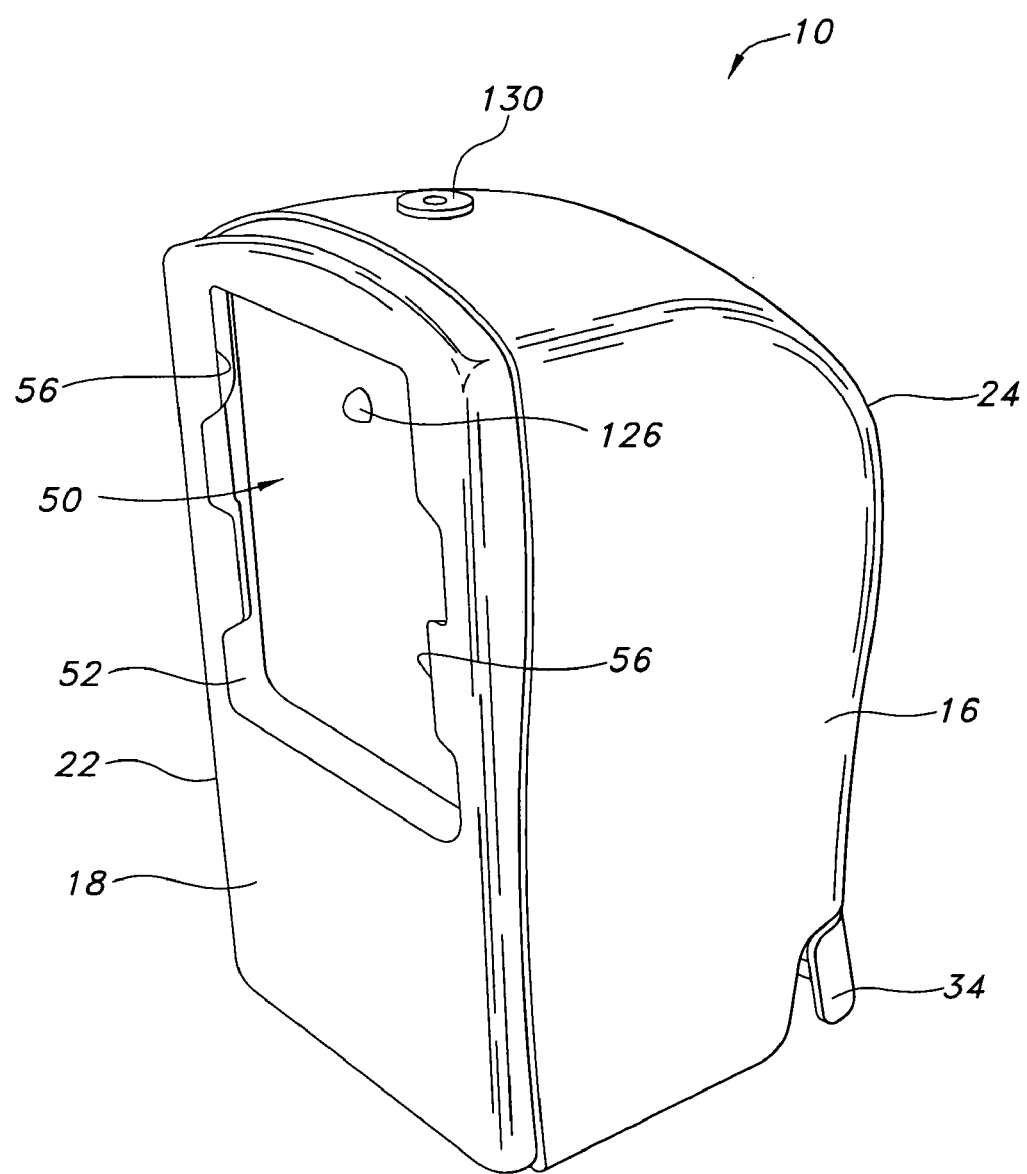
FIG. 2 is a perspective view of the back side of the dispenser illustrated in FIG. 1.

Referring to FIGS. 1 and 2, the dispenser 10 includes a housing, generally 14. The housing 14 may contain side walls or members 16, a back side 18, and a front side 20. The housing 14 can take on any desired configuration and be formed from any number of components. In the illustrated embodiment, the housing 14 includes a front component 24 and a back component 22. The front and back components are separately manufactured and are permanently joined by adhesives, welding, or any other relatively permanent attaching means. It should be appreciated that the components may be manufactured from any desired material. In a desirable embodiment, the dispenser 10 is a disposable item and the housing 14 is molded from a relatively inexpensive plastic material.

The housing 14 defines an internal liquid reservoir 68 (FIG. 3) within the internal volume thereof. In the illustrated embodiment, the liquid reservoir 68 includes essentially the entire volume defined by the front component 24 and back component 22. Although not illustrated, it should be understood that any number of internal structural members, such as baffles or the like, may be included within the reservoir 68. It should be understood that the housing 14 thus also serves as a closed or sealed reservoir and the maintenance technician cannot open the dispenser 10. A desired amount of viscous liquid, for example soap, is preloaded into the dispenser 10 prior to the dispenser being delivered to its point of use.

It may be desired to provide means for a maintenance technician to determine the level of viscous liquid within the dispenser. In this regard, a portion of the housing 14 may be formed from a translucent or clear material. The entire back component 22 may be formed from a translucent or clear material so that the service or maintenance technician can view the remaining liquid level from the side of the dispenser. In an alternative embodiment, a window (not shown) of clear or translucent material may be provide anywhere in the housing 14, desirably near the bottom portion of the housing, to provide the maintenance technician with the capability of viewing inside the reservoir to determine the remaining amount of liquid therein.

The dispenser 10 according to the invention also includes an integrally formed mounting mechanism configured as an integral component of the housing 14. This mounting mechanism allows the dispenser 10 to be detachably connected with a complementary mounting structure provided on a wall surface. As generally shown, the mounting mechanism is defined as an integrally molded feature of the back side 18 of the dispenser 10. In the illustrated embodiment, a recess 50 is molded into the back side 18. The recess 50 is defined by generally vertical side walls 52. Engaging structure is provided along the side walls 52 for engaging against or with complementary structure provided on the wall mounting structure. In the illustrated embodiment, the engaging structure is defined by angled surfaces 56 defined along the vertical walls 52. The angled surfaces 56 engage against complementary angled surfaces defined on the wall mounting structure. In the illustrated embodiment, at least two angled surfaces 56 are provided and are separated by a section of vertical wall 52. The two angled surfaces 56 engage against angled surfaces of the wall mounting structure. In order to attach the dispenser 10 to the wall mounting structure, the maintenance technician simply positions the dispenser 10 against the wall mounting structure such that the angled surfaces 56 are vertically disposed between the corresponding angled surfaces of the wall mounting structure. Then, the maintenance technician simply slides the dispenser 10 in a vertical direction so that the angled surfaces engage. In this interlocking configuration, the dispenser cannot be pulled away from the wall mounting structure. The double angled surface 56 configuration provided on each vertical wall 52 is particularly useful in that it provides an increased interlocking surface area of angled surfaces with relatively little vertical movement required between the dispenser 10 and the wall mounting structure as compared to a single angled surface 56 having the same longitudinal surface area.

Once the dispenser 10 has been properly located on the wall mounting structure, it is desirable to include a positioning device to indicate to the technician that the dispenser 10 has been properly positioned. The positioning device may include a protrusion 126 extending from the back side 18 of the housing within the recess 50. The protrusion 126 snaps into a correspondingly sized divot disposed on the wall mounting structure.

The wall mounting structure may include any manner of suitable attaching structure. The wall mounting structure serves simply to provide an interlocking engagement device for the dispenser 10. It should be appreciated that any manner of interlocking engaging configurations may be provided for detachably connecting the dispenser 10 to complementary wall structure provided on a supporting wall. A desirable feature of the invention is that the entire dispenser 10 is disposable and, thus, relatively simple yet reliable engagement devices are desirable. It has been found that the double angled surface configuration as illustrated and described herein is particularly useful in this regard. Additionally, the wall structure may include a device for locking the dispenser 10 to the wall structure. Desirable mounting structures, for example, are disclosed in concurrently filed U.S. patent application Ser. No. 10/745,783, Express Mail Number EL 955701957 US, the entirety of which is incorporated herein by reference.

It should be appreciated that dispensers according to the invention are not limited in their size so long as the mounting mechanism between the housing and wall mounting structure is structurally sufficient to support the weight of the filled housing.

The back component 22 of the housing 24 is desirably more rigid than the front component 24. One way of achieving this feature is to simply mold the back component 22 with a thickness greater than that of the front component 24. The dispenser 10 is mounted onto a supporting wall surface by means of an internal mounting mechanism configured on the back side 18 of the housing 14. A more rigid back component 22 aids in mounting the dispenser 10. If the front and back components are molded from a resilient plastic material, once the dispenser is empty, the back component 22 has enough "give" to enable the dispenser 10 to be easily removed from the supporting wall structure.

Figure 3:
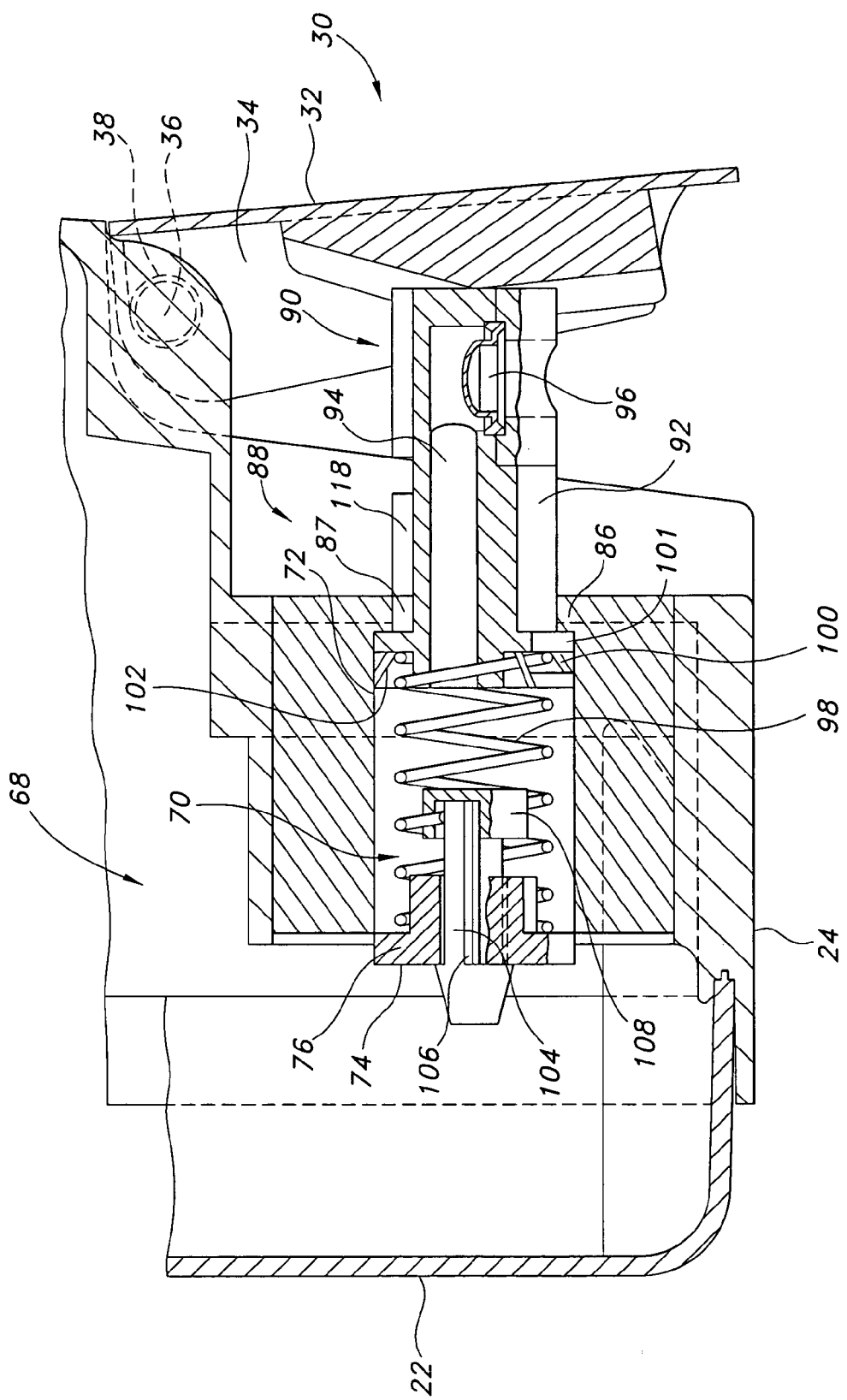
FIG. 3 is a cross-sectional view of the pump mechanism of the dispenser taken along the lines indicated in FIG. 1.

Referring to FIG. 3, a dispensing pump mechanism, generally 88, is disposed at least partially within the reservoir 68. The pump mechanism 88 has a delivery end 90 that extends out of the housing 14 or reservoir 68. The pump mechanism 88 is configured to dispense a metered amount of the viscous fluid upon a user actuating the pump mechanism. It should be appreciated that any number of conventional and well known pump devices may be utilized in the dispenser 10. The pump mechanism 88 illustrated in the drawings is one embodiment of a particularly well suited mechanism. Other desirable pump mechanisms, for example, are disclosed in copending U.S. patent application Ser. No. 10/675,034, filed Sep. 30, 2003, the entirety of which is incorporated herein by reference.

It is also within the scope of the invention to configure a removable pump mechanism with the housing 24. For example, any manner of conventional pump may be screwed or otherwise mated with the housing 24 so as to be in communication with the reservoir 68. For example, such a pump mechanism may include a self-contained pump having a pump chamber housing, cap, or other suitable structure that is fitted to a bore defined through a front wall of the housing 24 so as to be in communication with the internal reservoir 68. Installation of the pump could take place at the point of use of the dispenser. For example, the pump from a spent dispenser may be removed from the housing and immediately installed into a replacement housing. A removable plug or breakable seal could be used to cover the housing port through which the pump is inserted.

Figure 4:
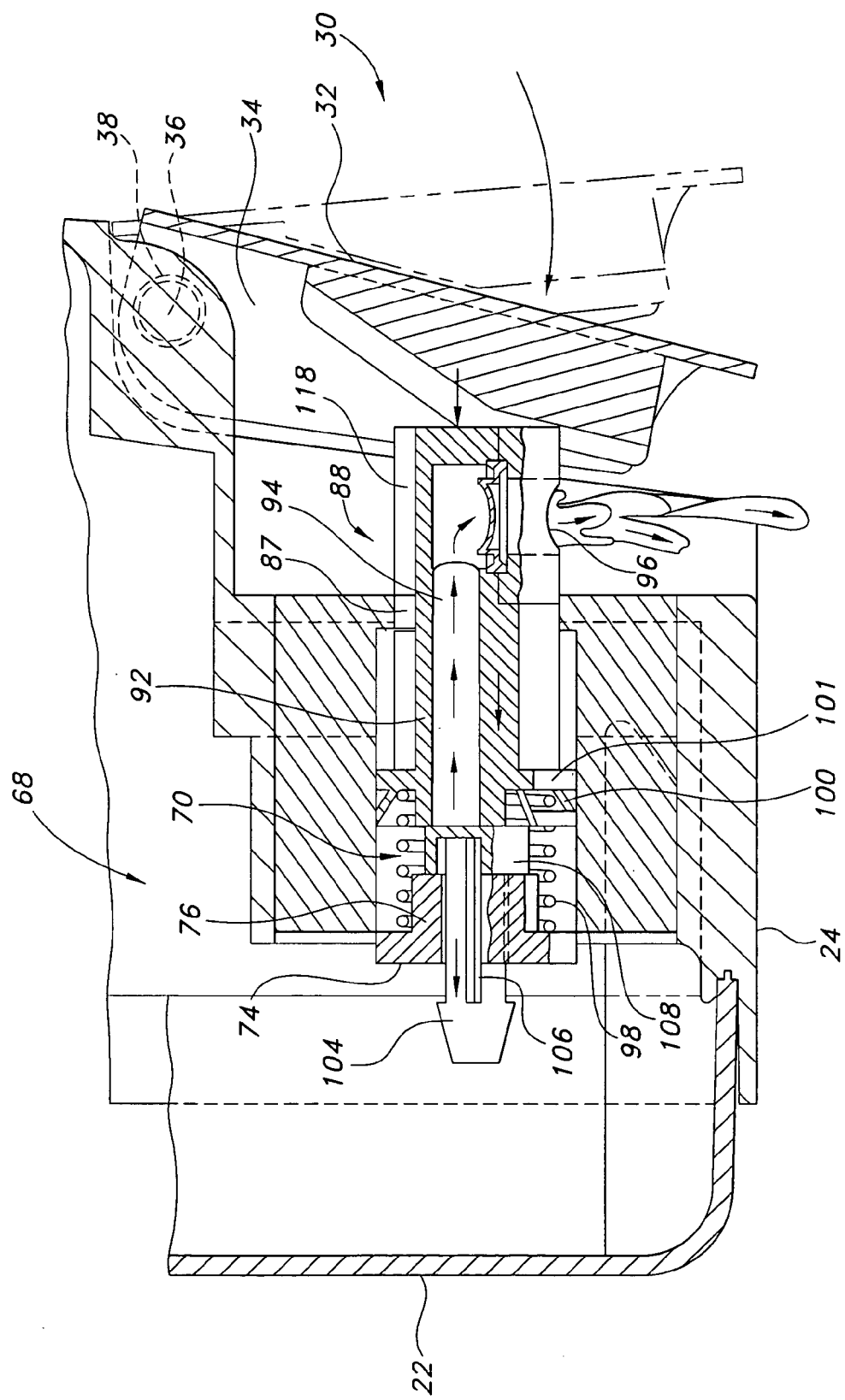
FIG. 4 is a cross-sectional operational view of the pump mechanism.
Figure 5:
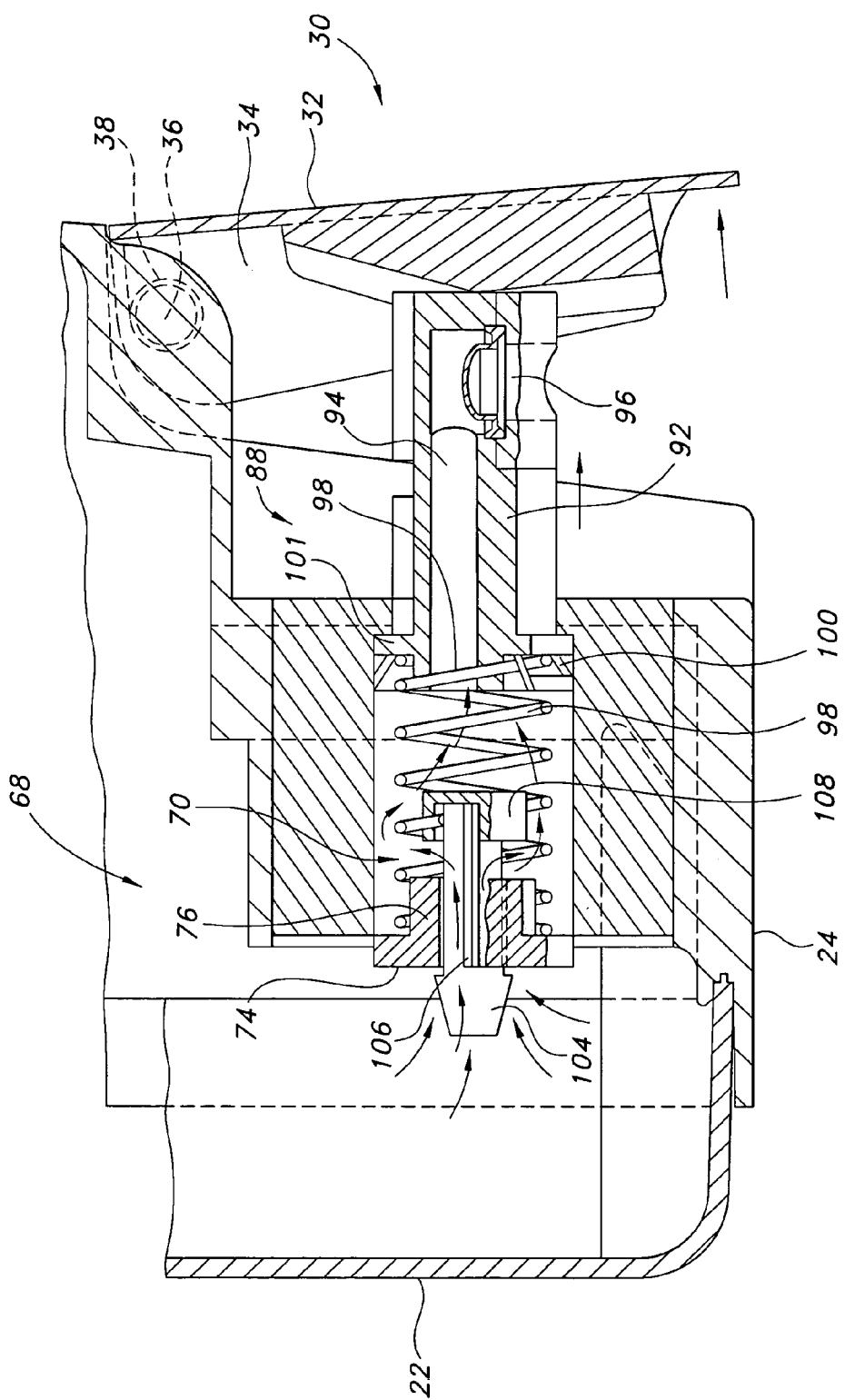
FIG. 5 is a cross-sectional operational view of the pump mechanism.

Referring to FIGS. 3 through 5, the pump mechanism 88 includes a cylinder 92 that is slidable within a chamber 70. The volume of chamber 70 determines the metered dose of liquid dispensed upon each actuation of the pump. The chamber 70 may be formed by any internal structure of the housing 14. It may be desired that the chamber is defined by structure integrally molded with the front component 24 of the housing 14. In the illustrated embodiment, the chamber 70 is defined by chamber walls 72 as a generally cylindrical chamber. The cylinder 92 includes a channel 94 defined longitudinally therethrough. The channel 94 is in communication with the interior of the pump chamber 70 through an end wall of the cylinder. The delivery channel 94 terminates at a dispensing orifice 96 defined in the front end of the cylinder 92.

The cylinder 92 sealingly engages against the chamber walls 72 by any conventional means. For example, a flange or piston 101 may be disposed at the rear end of the cylinder 92 for sealing engagement against chamber wall 72. In an alternative embodiment, O-rings 116 (FIG. 6A) may be provided around the piston 101. The piston 101 pressurizes the chamber 70 and ensures that the viscous liquid contained within the chamber is dispensed through the delivery channel 94 upon actuation of the cylinder 92 and does not simply move from one end of the pump chamber 70 to the other upon movement of the cylinder.

The pump cylinder 92 is biased within the chamber 70 by way of, for example, a spring 98. Other resilient devices, including a leaf spring, spring washer, and the like, may be utilized for this purpose. In the illustrated embodiment, the spring 92 is seated within a recess 102 defined by a flared flange 100. The opposite end of the spring 98 is fitted around a cylindrical extension 76 of an end cap 74. The end cap 74 is permanently fixed to the structure defining the pump chamber 70 after the cylinder 92 has been inserted into the pump chamber.

Structure is also provided to ensure that the cylinder 92 cannot be pulled from the front end of the chamber 70. In the illustrated embodiment, this structure corresponds to a flange portion of the front wall 86 of the chamber 70. As illustrated in FIG. 3, the flange portion 86 of the wall engages against the piston 101 of the pump cylinder 92.

A check valve device 104 is configured with the pump mechanism 88 to ensure that the viscous liquid within the pump chamber 70 is not pushed out of the chamber 70 upon movement of the cylinder 92 within the chamber 70. In the illustrated embodiment, the check valve device 104 is a shuttle type check valve having radially extending arms 106. The shuttle valve is slidably disposed within an opening defined through the end cap 74. The space between the radial arms 106 is open to the reservoir 68 so that the liquid can flow from the reservoir 68 into the pump chamber 70 upon movement of the cylinder to the forward end of the pump chamber 70, as illustrated in FIG. 5. A cap 108 is provided on the forward end of the shuttle valve 104 disposed within the pump chamber 70 to ensure that the opening in the end cap 74 is sealed upon actuation of the pump. The cap 108 seals against the end face of the end cap 74.

Operation of the pump mechanism 88 is particularly illustrated in FIGS. 4 and 5. To dispense a metered amount of the viscous liquid contained within the reservoir 68, a user actuates the pump mechanism 88 by way of an actuator 30. The actuator 30 may be any member configured to move the pump cylinder 92. The actuator 30 may be defined by a panel member 32 that includes side walls 34 having inwardly disposed protrusions 36 that engage within recesses 38 provided in the sides 16 of the housing 14. A depression 33 (FIG. 1) may be defined in the front face of the panel member 32 to indicate to a user the proper location for depressing the actuator 30. Upon depressing the actuator 30, the pump cylinder 92 is moved rearward within the pump chamber 70. Pressure of the viscous liquid within the chamber 70 forces the shuttle valve 104 to close and the viscous liquid contained within the chamber 70 is directed into the delivery channel 94 defined longitudinally within the pump cylinder 92. The viscous liquid is expelled through the dispensing orifice 96, as particularly illustrated in FIG. 4. Upon release of the actuator 30, the spring 98 forces the pump cylinder to return to the position illustrated in FIG. 5. This action unseats the shuttle valve 104 and draws viscous liquid back into the pump chamber 70, as particularly illustrated in FIG. 5.

Figure 6A:
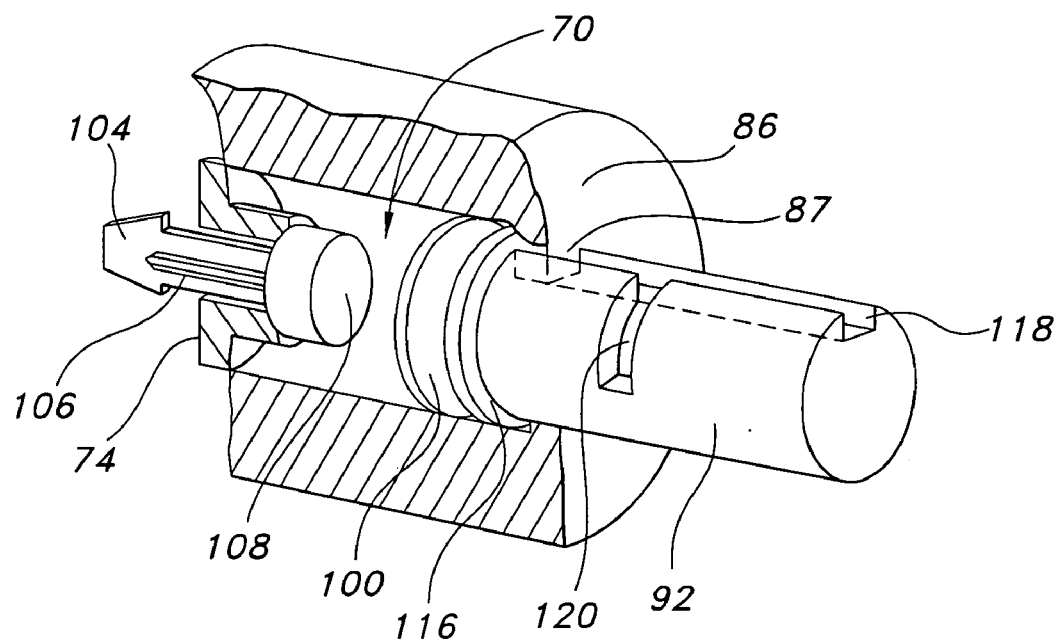
FIG. 6a is a partial perspective and cut-away view of the pump mechanism particularly illustrating the locking feature thereof.
Figure 6B:
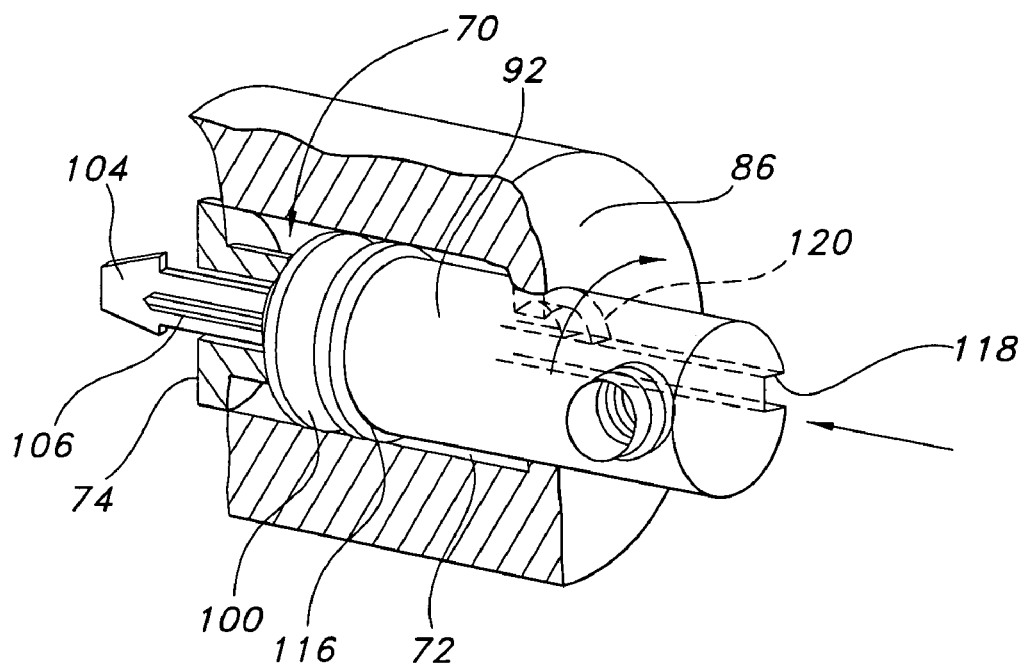
FIG. 6b is a partial perspective and cut-away view of the pump mechanism particularly illustrating the locking feature thereof.
Figure 8:
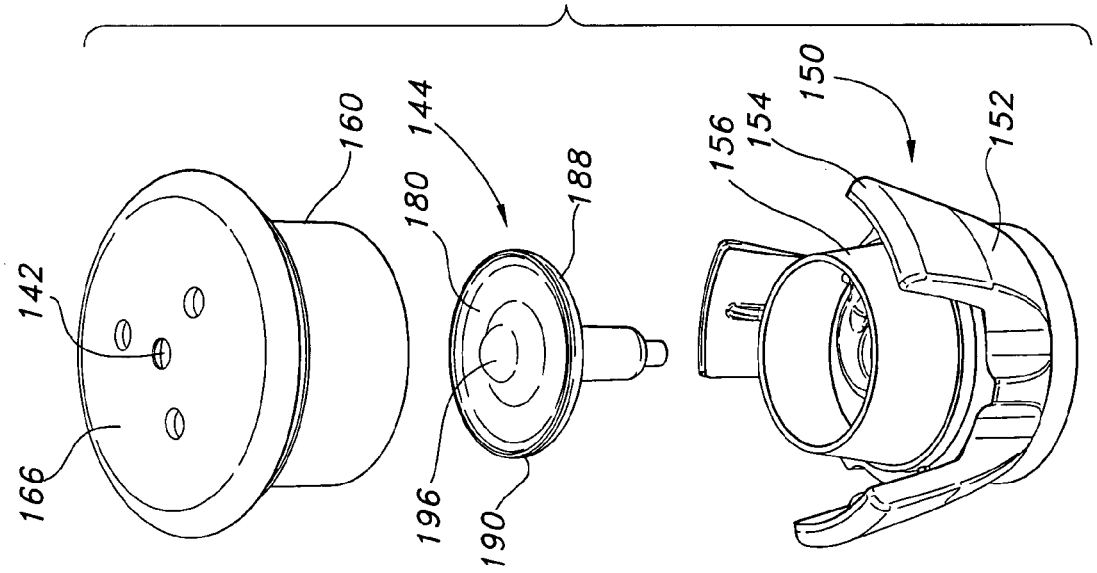
FIG. 8 is an exploded perspective view of the vent plug of FIG. 7.
Figure 7:
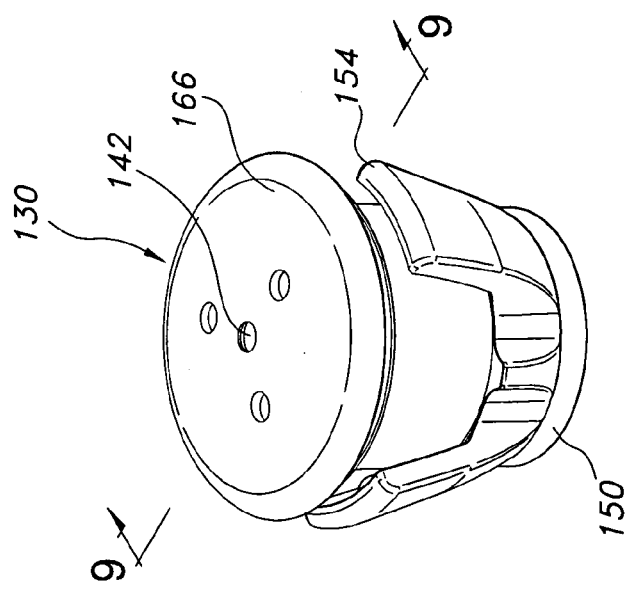
FIG. 7 is a perspective view of the vent plug of the present invention.

FIGS. 6a and 6b illustrate a locking characteristic of the pump cylinder 92 that is particularly useful during shipment of the dispenser 10. The pump cylinder 92 may include a longitudinal channel 118 defined in the top thereof. A tab portion 87 of the pump chamber front wall member 86 is disposed within the longitudinal channel 118. In this way, the pump cylinder 92 is prevented from rotating upon actuation and release thereof. A partial circumferential channel 120 is defined in the pump cylinder 92, as particularly illustrated in FIG. 6a. The circumferential channel 120 is defined along the pump cylinder 92 at a location corresponding to the completely depressed or actuated position of the cylinder 92 within the chamber 70, as illustrated in FIG. 4. For shipment of the dispensers 10, the pump cylinder 92 may be depressed and then rotated so that the tab 87 is engaged within the circumferential channel 120, as particularly illustrated in FIG. 6b. In this configuration, the pump cylinder 92 is locked in position and cannot move within the chamber 70 until the pump cylinder is rotated back into the position illustrated in FIG. 6a. This procedure would be accomplished by the maintenance technician prior to mounting the dispenser 10 onto a supporting wall surface. Other lockout devices may be useful for substantially preventing leakage during shipment of the pump. Desirable lockout devices, for example, are disclosed in concurrently filed U.S. patent application Ser. No. 10/745,755, Express Mail Number EL 955701815 US, the entirety of which is incorporated herein by reference.

So as not to draw a vacuum within the reservoir 68, the reservoir is vented. This venting may be accomplished at various locations. One desirable venting location as illustrated in FIG. 1 is to vent at the top of the housing 14, for example, by way of a vent valve 130 disposed through the top surface of the housing 14.

FIGS. 7 through 12 illustrate embodiments of the vent mechanism 130 of the present invention. The vent prevents a vacuum from being drawn in the reservoir 68 by equalizing pressure between the reservoir and the surrounding environment. The vent mechanism 130 is configured to be disposed through an opening 138 in the upper wall 132 of the housing. This opening 138 may also serve as a fill port for initially filling the reservoir 68. The vent mechanism 130 includes a body, generally 150, that interlocking and sealingly engages with the wall 132. In the embodiment illustrated, the body 150 is inserted through the opening 138 and subsequently automatically engages against the inner surface 136 of the wall 132 so that the vent mechanism 130 cannot thereafter be pulled from the housing.

The vent body 150 in the shown embodiment includes an upper body portion 160 and a lower body portion 152. These portions are separately molded or formed and subsequently joined, for example by snuggly inserting the lower body portion 152 into or onto the upper body portion 160.

The lower body portion 152 is a generally cylindrical or truncated component defining a lower vent passage 158. At least one, and desirably a plurality, of resilient members, such as resilient tabs 154, is configured on the body to engage and secure the vent 130 to the housing wall 132. The resilient tabs 154 are angled away from a vertical axis through the lower body portion 152 so that they are able to flex inward upon insertion of the lower body portion 152 through the opening 138. Once the tabs 154 have cleared the inside surface 136 of the wall, they flex radially outward. The vent 130 thus cannot thereafter be pulled from the housing.

The lower body portion 152 includes a substantially rigid cylindrical wall 156 positioned inward of the resilient tabs 154 and oriented generally parallel to a vertical axis through the lower body portion. This wall 156 is sized to fit over or around the upper body portion 160.

It should be appreciated that various structural configurations are possible to define the resilient member 154 and lower body portion 152, and that the illustrated embodiment is not intended to limit the invention.

The upper body portion 160 is a generally cylindrical member defining an upper vent passage 162 terminating in a vent orifice 142. The upper vent passage 162 is aligned with the lower vent passage 158 upon assembly of the upper body portion 160 with the lower body portion 152.

The upper body portion 160 further includes a cap, generally 166. The vent orifice 142 is defined through the center of the cap 166. The cap 166 is a plate-like member and includes a resilient circumferential lip 168. This lip 168 defines a first seal between the vent mechanism 130 and the dispenser housing 14. In its unstressed or relaxed state shown in dashed lines in FIGS. 11 and 12, the resilient lip 168 has a radius of curvature greater than that of the remaining portion of the cap 166. Upon insertion of the vent through the housing opening 138, the lip 168 is pressed against a surface of the housing upper wall 132 and is caused to flatten out and seal against the housing surface. To ensure that a constant compressive force is applied to the cap 166, the distance between the edge of the lip 168 and the top of the resilient tabs 154 is less than the thickness of the housing wall 132. In this way, once the vent has been inserted through the housing wall, the resilient tabs 154 also exert a constant downward pulling force on the cap 166 causing the resilient lip 168 to compress and seal against the housing surface.

Figure 11:
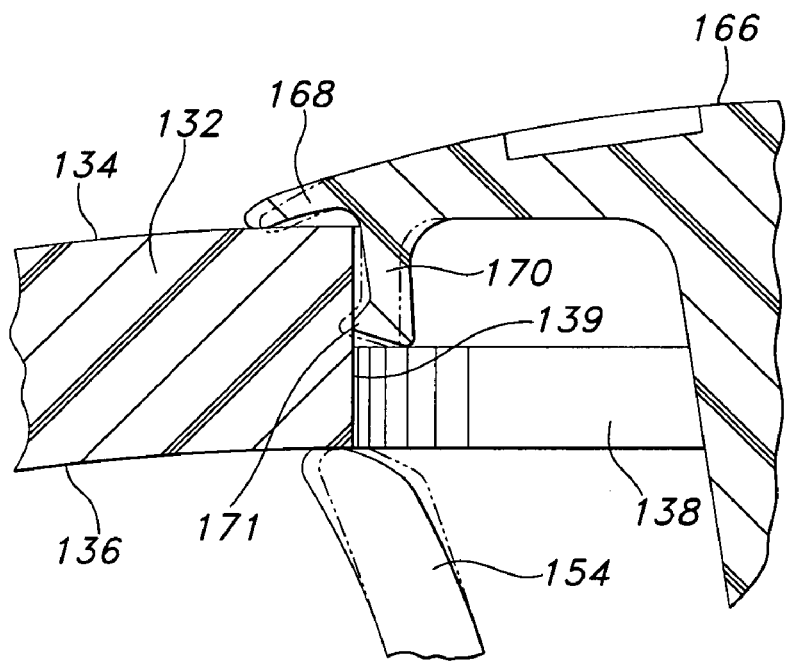
FIG. 11 is an enlarged cross-sectional view of the designated portion of FIG. 9 for a straight bore in the housing wall.
Figure 12:
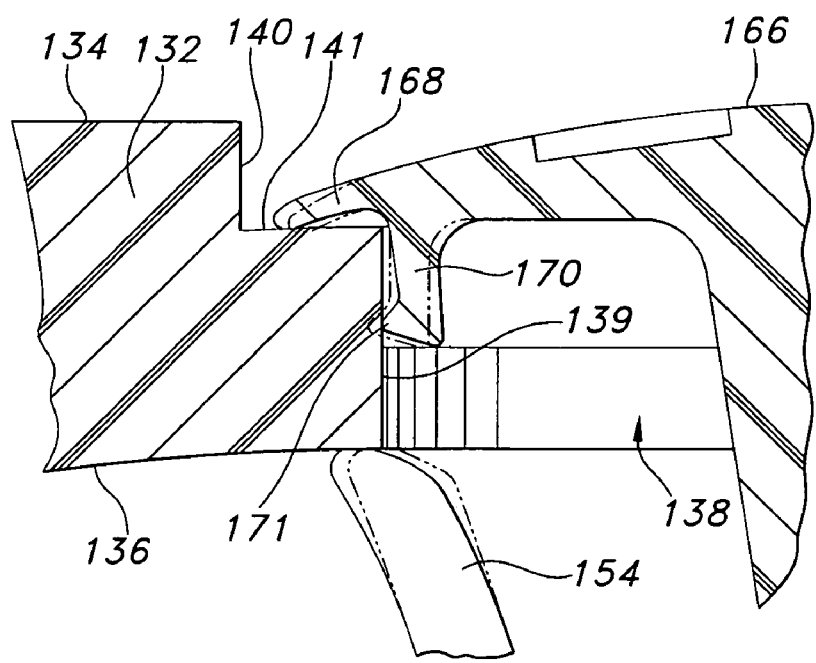
FIG. 12 is an enlarged cross-sectional view of the designated portion of FIG. 9 for a countersunk bore in the housing wall.

The upper body portion 160 also includes a resilient skirt member 170 extending downwardly from an underside of the cap 166. A foot 171 is defined at the end of the skirt 170. The skirt and foot configuration define an independent second seal between the vent mechanism and the dispenser housing. Referring to FIGS. 11 and 12, the skirt foot 171 has a relaxed or unstressed diameter greater than that of the opening 138 through the housing wall 132, as indicated by the dashed lines in the figures. Upon insertion of the vent mechanism 130 through the opening 138, the skirt 170 is compressed radially inward and the foot 171 sealingly engages against a substantially vertical wall 139 of the opening.

In the embodiment illustrated in FIG. 11, the wall 139 defines the opening 138 in the housing wall 132. The foot 171 of the resilient skirt 170 seals against the wall 139, and the resilient lip 168 seals against the upper surface 134 of the housing wall. In this configuration, it is necessary that the skirt does not have a vertical length greater than the thickness of the housing wall 132.

In the embodiment of FIG. 12, the opening 138 is defined as a counterbore hole having a second wall 140 radially offset from the wall 139. In this configuration, the resilient lip seals against the counterbore circumferential wall or ledge 141, and the cap 166 is more or less flush with the upper surface 134 of the housing wall depending on the depth of the wall 140. In this configuration, the lip 168 should not extend to the second wall 140 and the skirt 170 should not extend below the wall 139.

A vent plug, generally 144, is movably disposed in the vent passage 162 to seal the vent orifice 142 in an at-rest or static condition of the vent mechanism 130. The vent plug 144 generally includes a plate-like or disk-like member 180 having an upper surface 182 and a lower surface 184. The shape of the plate-like member 180 generally matches the cross-sectional shape of the upper vent passage 162. Desirably, the shape of the plate-like member 180 is generally circular. A resilient member 172 resiliently biases the plate-like member 180 against the inner lower surface 186 of the upper body portion 160 or cap 166. The resilient member 172 may be one of many types known to those skilled in the art, such as, for example, springs, leaf springs, coiled springs, and so forth. Desirably, the vent plug 144 further includes an extension member 187 attached at a first end 189 to the lower surface 184 of the plate-like member 180. A second end 191 of the extension member 187 is in contact with the resilient member 172. The extension member 187 transfers force from the resilient member 172 to the plate-like member 180.

Extending toward the inner lower surface 186 of the upper body portion 160 and from the perimeter 188 of the plate-like member 180 is a sealing rim or ridge 190. In the vent plug's static position, the sealing rim 190 is resiliently biased against the inner lower surface 186 of the upper body portion 160 and the vent orifice 142 is blocked from communication with the lower vent passage 158. The reservoir 68 is thus essentially sealed to the external environment. Desirably, the sealing rim 190 extends substantially perpendicular to the upper surface 182 of the plate-like member 180 to minimize permanent deflection or other damage to the sealing rim caused by force exerted on the sealing rim by the inner lower surface 186 of the upper body portion 160.

An internal open volume 193 is defined between the upper surface 182 of the plate-like member 180 and the inner lower surface 186 of the cap 166. The internal open volume 193 has a cross-sectional area extending perpendicular to a vertical axis extending through the vent orifice 142 and the vent passage 162 substantially equivalent to the cross-sectional area of the upper surface 182 of the plate-like member 180. The cross-sectional area of the internal open volume 193 is larger than the cross-sectional area of the vent orifice 142 at the narrowest point of the vent orifice. Desirably, the cross-sectional area of the internal open volume 193 is greater than about five times the cross-sectional area of the vent orifice 142 at the narrowest point of the vent orifice. More desirably, the cross-sectional area of the internal open volume 193 is greater than about ten times the cross-sectional area of the vent orifice 142 at the narrowest point of the vent orifice. Even more desirably, the cross-sectional area of the internal open volume 193 is greater than about twenty times the cross-sectional area of the vent orifice 142 at the narrowest point of the vent orifice.

In a static or at-rest mode of the vent mechanism 130, the vent plug 144 is resiliently pressed into engagement against the inner lower surface 186 of the cap 166 in which is defined the vent orifice 142. This engagement may be an essentially airtight seal. Upon a user actuating the pump mechanism to dispense a dose of viscous liquid from the reservoir 68, a partial vacuum is drawn in the reservoir and a pressure differential is established across the vent plug 144. When the partial vacuum or pressure differential is greater than the force exerted by the resilient member 172, the vent plug 144 is pulled down or away from the vent orifice 142. Once the vent plug 144 unseats, pressure between the reservoir 68 and the outside environment equalizes and the vent plug will subsequently reseat against the inner lower surface 186 of the cap 166 until sufficient pressure differential is reached again. In this regard, it should be noted that the resilient member 172 should be "sized" so that the vent plug 144 can unseat from the inner lower surface 186 of the cap 166 at the degree of vacuum generated inside the reservoir 68 at a point prior to deformation of the housing or cavitation of the pump mechanism. For example, if a spring is utilized as resilient member 172, such spring should not have a spring constant so great that the vent plug 144 is prevented from unseating and equalizing pressure upon a user actuating the pump dispenser beyond a predetermined number of activations or pressure differential.

Desirably, the cross-sectional area of the upper surface of the plate-like member 180 is only slightly smaller than the cross-sectional area of the upper vent passage 162. Such a configuration will maximize the force differential between the upper surface 182 of the plate-like member 180 and the lower surface 184 of the plate-like member when the sealing rim 190 is in contact with the inside lower surface 186 of the upper body 160, thus minimizing the pressure differential necessary to overcome the force applied by the resilient member 172 and activate the vent mechanism 130. However, a gap 192 must remain between the perimeter 188 of the plate-like member 180 and an outer surface 194 of the upper vent passage 162 to permit air to flow around the plate-like member during the venting process.

The thickness of the plate-like member 180 between the upper surface 182 and the lower surface 184 is desirably small compared to the diameter of the plate-like member. A thin plate-like member 180 reduces the mass of the vent plug 144, thus reducing the spring force required to bias and seal the vent plug against the inner lower surface 186 of the upper body 160. The combination of the low spring force and the large cross-sectional area acted upon by the pressure differential results in a highly sensitive and effective vent mechanism 130. However, the plate-like member 180 should not be so thin that the force of the spring acting on the lower surface 184 of the plate-like member causes over-deflection or other damage thereto. The optimum thickness will depend upon the material of manufacture, but, generally, the thickness of the plate-like member 180 is desirably between about 5% and about 40% of the diameter of the plate-like member, more desirably between about 5% and about 30% of the diameter of the plate-like member, even more desirably between about 5% and about 20% of the diameter of the plate-like member, and even more desirably between about 5% and about 10% of the diameter of the plate-like member. To reduce deflection or damage at the perimeter 188 of the plate-like member 180, the plate-like member may be thicker near its vertical axis or center than at the perimeter.

Desirably, the vent plug 144 further includes a protrusion 196 attached to or formed integrally with the upper surface 182 of the plate-like member 180. The protrusion 196 is aligned with the vertical axis of the vent orifice 142. However, the height of the protrusion 196 is selected such that when the plate-like member 180 is biased against the inner lower surface 186 of the cap 166 by the resilient member 172, the sealing rim 190 will contact the inner lower surface of the cap rather than the protrusion, thus allowing a gap 198 to remain between the protrusion and the inner lower surface of the cap. Therefore, while the sealing rim 190 serves as the primary vent seal, the protrusion 196 is positioned to serve as a secondary seal in the event the sealing rim becomes deformed or damaged to the point that the protrusion contacts the inner lower surface 186 of the cap 166. The protrusion 196 may extend further from the upper surface 182 of the plate-like member 180 than the sealing rim 190 if, for example, the vent orifice 142 is countersunk on the inner lower surface 186 of the cap 166 as illustrated in FIGS. 9 and 10. However, if the inner lower surface 186 of the cap 166 is not countersunk at the vent orifice 142, the protrusion 196 desirably does not extend above the sealing rim 190. The protrusion 196 is desirably semi-spherical so as to effectively seal the vent orifice 142 if necessary.

It should be appreciated by those skilled in the art that various modification or variations can be made in the invention without departing from the scope and spirit of the invention. It is intended that the invention include such modifications and variations as come within the scope of the appended claims and their equivalents.

What is claimed is:

1. A self-contained viscous liquid dispenser, comprising:
   a housing;
   an internal liquid reservoir defined by the housing;
   a manually operated dispensing pump mechanism disposed in liquid communication with the reservoir and having a delivery end disposed for delivering metered doses of viscous liquid from the reservoir upon actuation thereof by a user;
   a vent mechanism disposed in an upper wall of the housing, the vent mechanism comprising:
      a body member insertable through an opening in the housing wall, the body member defining a vent orifice disposed through an inside lower surface of the body member and a vent passage in communication therewith; and
      a movable plug member resiliently disposed in the vent passage, the plug member comprising a plate-like member having a perimeter and a ridge attached to and extending from the perimeter to contact the inside lower surface, wherein the ridge seals the orifice from the vent passage in an at-rest position, and wherein the plug member is movable to unseal the orifice and vent the reservoir upon a sufficient vacuum being established in the reservoir upon actuation of the pump mechanism.

2. The dispenser of claim 1, wherein the ridge extends substantially perpendicular to an upper surface of the plate-like member.

3. The dispenser of claim 1, wherein the plug member comprises a protrusion attached to the plate-like member, the protrusion located proximate the vent orifice.

4. The dispenser of claim 3, wherein the protrusion is aligned with the vent orifice.

5. The dispenser of claim 4, wherein the protrusion extends into the vent orifice, and further wherein the protrusion does not contact the body member.

6. The dispenser of claim 1, wherein the cross-sectional shape of the plate-like member substantially matches the cross-sectional shape of the vent passage.

7. The dispenser of claim 1, wherein the inside lower surface of the body member and the upper surface of the plate-like member define an opening having a cross-sectional area greater than about five times the cross-sectional area of the vent orifice.

8. The dispenser of claim 1 wherein the thickness of the plate-like member is between about five percent and about forty percent of the diameter of the plate-like member.

9. The dispenser of claim 1, wherein the body member further includes at least one resilient member configured to engage and lock the body member to the housing wall.

10. The dispenser of claim 9, wherein the body member includes at least one resilient tab disposed to engage against an inner surface of the housing wall and exert an inward pulling force on the body member.

11. The dispenser of claim 10, including a plurality of the resilient tabs circumferentially spaced around the body member.

12. The dispenser of claim 9, wherein the body member further comprises a cap, the vent orifice defined through the cap, the cap further comprising a radially extending resilient circumferential lip that sealingly engages against the housing wall.

13. The dispenser of claim 12, wherein the cap is disposed above an upper surface of the housing wall, the resilient lip sealingly engaging against the upper surface.

14. The dispenser of claim 12, wherein the cap is disposed in a counterbore defined in the housing wall, the resilient lip sealingly engaging against a circumferential wall of the counterbore.

15. The dispenser of claim 12, wherein the cap further comprises a downwardly extending resilient annular skirt that sealingly engages against the housing wall.

16. The dispenser of claim 15, wherein the resilient annular lip engages against a circumferential side of the opening in the housing wall.

17. A self-contained viscous liquid dispenser, comprising:
   a housing;
   an internal liquid reservoir defined by the housing;
   a manually operated dispensing pump mechanism disposed in liquid communication with the reservoir and having a delivery end disposed for delivering metered doses of viscous liquid from the reservoir upon actuation thereof by a user;
   a vent mechanism disposed in an upper wall of the housing, the vent mechanism comprising:
      a body member disposed within an opening in the housing wall, the body member comprising a cap circumferentially sealed against the opening in the housing wall, the cap defining a vent orifice disposed therethrough to a vent passage in communication therewith;
      a movable plug member disposed in the vent passage, the plug member comprising a disc-like member having a perimeter and a ridge attached to and extending from the perimeter; and
      a resilient member attached to the body member and contacting the plug member wherein the plug member is resiliently biased towards an at-rest position;
   wherein the ridge seals the vent orifice from the vent passage in the at-rest position, and wherein the plug member is movable to unseal the vent orifice and vent the reservoir upon a sufficient vacuum being established in the reservoir.

18. A self-contained viscous liquid dispenser, comprising:
a housing defining an internal liquid reservoir;
a pump mechanism disposed in liquid communication with the reservoir for delivering metered doses of viscous liquid from the reservoir;
a vent mechanism disposed in an upper wall of the housing, the vent mechanism comprising:
 a cap sealingly disposed within an opening in the housing wall, the cap defining a vent orifice therethrough;
 a vent body sealingly attached to an inside surface of the cap, the vent body defining a vent passage having upper and lower portions, wherein the vent passage is in communication with the vent orifice; and
 a movable plug member resiliently disposed in the vent passage, the plug member comprising a plate-like member and a ridge extending from a perimeter of the plate-like member, wherein the ridge seals the vent orifice from the lower portion of the vent passage in an at-rest position, and wherein the plug member is movable to unseal the orifice and vent the reservoir upon a sufficient vacuum being established in the reservoir.

19. The dispenser of claim 18, wherein the plug member further comprises a protrusion attached to the plate-like member, the protrusion being aligned with the vent orifice.

20. The dispenser of claim 19, wherein the protrusion extends into the vent orifice, and further wherein the protrusion and the cap define a gap that provides communication between the vent orifice and the upper portion of the vent passage.

* * * * *